United States Patent
Hopkins

(10) Patent No.: US 7,349,189 B2
(45) Date of Patent: Mar. 25, 2008

(54) ELECTRICAL SURGE PROTECTION USING IN-PACKAGE GAS DISCHARGE SYSTEM

(75) Inventor: James Michael Hopkins, Richardson, TX (US)

(73) Assignee: Finisar Corporation, Sunnyvale, CA (US)

( * ) Notice: Subject to any disclaimer, the term of this patent is extended or adjusted under 35 U.S.C. 154(b) by 96 days.

(21) Appl. No.: 11/123,676

(22) Filed: May 6, 2005

(65) Prior Publication Data

US 2006/0250733 A1    Nov. 9, 2006

(51) Int. Cl.
 *H02H 9/00* (2006.01)
(52) U.S. Cl. .................................................. 361/56
(58) Field of Classification Search ................ 361/56
 See application file for complete search history.

(56) References Cited

U.S. PATENT DOCUMENTS

| | | | | |
|---|---|---|---|---|
| 3,968,393 | A * | 7/1976 | Murano et al. ............. | 313/325 |
| 4,214,211 | A * | 7/1980 | Yokogawa .................. | 455/287 |
| 4,945,442 | A * | 7/1990 | Brockschmidt et al. ....... | 361/56 |
| 5,760,673 | A * | 6/1998 | Hassler et al. .............. | 337/168 |
| 5,982,180 | A * | 11/1999 | Bushman ................... | 324/326 |
| 6,185,240 | B1 * | 2/2001 | Jiang et al. ............ | 372/50.124 |
| 6,355,958 | B1 * | 3/2002 | Orchard-Webb ............ | 257/355 |
| 6,387,730 | B2 * | 5/2002 | Guillot ....................... | 438/107 |

FOREIGN PATENT DOCUMENTS

DE     2443304 A * 3/1976

OTHER PUBLICATIONS

Fairchild Semiconductor, Plastic TO-46 DIODE, Jul. 2002, p. 1.*
IBM, Spark Gap on Module to Protect MOS LSI Chips, Jan. 1977, IBM Technical Disclosure Bulletin, vol. 19 Issue 8, pp. 3110-3111.*
Surface Mount Surge Arresters—CG/CG2 MS Series. Datasheet [online]. SRC Devices [retrieved on Dec. 27, 2004]. Retrieved from Internet: <URL: www.srcdevices.com/pdf/CG2MS.pdf>.
Zou, Han. Ethernet Protection—A While Solution. Technical Article [online]. Protek Devices [retrieved on Dec. 27, 2004]. Retrieved from Internet: <URL: www.protekdevices.com/appnotes/EthernetProtection1.pdf>.
Mohan, N. and Kumar A. ESD Protection Design Methodology in Deep Sub-Micron CMOS Technologies. Cource E&CE 730 Project Report [online], Winter 2003 [retrieved on Dec. 27, 2004]. Retrieved from Internet: <URL:www.ece.uwaterloo.ca/~n2mohan/ece730_report.pdf>.

* cited by examiner

*Primary Examiner*—Michael Sherry
*Assistant Examiner*—Ann T. Hoang
(74) *Attorney, Agent, or Firm*—North Weber & Baugh LLP

(57) ABSTRACT

The present invention comprises using an electrode (107) arranged with a small gap or opening (108) placed in parallel with an electrically sensitive component (105) and housed with a gas inside an enclosure (100) to form a discharge gap. Such configurations may protect against low level voltage spikes, but in so doing, do not significantly add input capacitance.

23 Claims, 6 Drawing Sheets

ELECTRICAL SURGE PROTECTION USING IN-PACKAGE GAS DISCHARGE SYSTEM

BACKGROUND

A. Technical Field

The present invention relates generally to protection of electrically sensitive components, and more particularly, to the use of gas discharge systems and methods of using the same to protect electrically sensitive components.

B. Background of the Invention

Certain electronic components, such as semiconductor components, can be very sensitive to voltage levels. As data communication devices have increased in performance and processing speeds, they have also increased in susceptibility to damage from voltage spikes, such as from electrostatic discharge (ESD). For example, Vertical Cavity Surface Emitting Laser (VCSEL) transmitters may be damaged by ESD events of 100 volts or more.

Excess voltage levels may result in catastrophic failure of the components. Alternatively, excess voltage levels may create latent defects that degrade the components performance and/or its lifespan. Components so affected may create diagnostic problems because the latent defects may not be detectable. Thus, a defective component may initially test within acceptable limits, but its actual, later performance may be substandard or unacceptable.

A number of devices have been employed to minimize the damage caused by voltage spikes. Threshold voltage devices, gas discharge tubes, and diodes have been used to clamp voltage surges and electrostatic discharge (ESD) voltage spikes in discrete circuits, circuit boards, and communication/data systems.

Such protection mechanisms are not, however, possible for all applications. For example, electrical discharge protection of high speed devices, such as VCSELs, is not possible using these devices due to the high speeds at which these devices operate, and/or due to their extreme sensitivity to ESD damage. Existing protection methods incorporate excess capacitance into the protected assembly, degrading its performance at high data rates. Existing gas discharge protection methods, while adding little capacitance, are too bulky and have breakdown threshold voltages too high to protect these high speed devices. Since existing techniques for excess voltage protection involve added input capacitance, and usually protect against greater than 100 volts, these techniques are not suitable for protection of some components, such as VCSEL devices.

Accordingly it is desirable to provide protection of electrically sensitive components but without drastically affecting the component's or system's performance.

SUMMARY OF THE INVENTION

In general, exemplary embodiments of the invention are concerned with systems and methods that allow for the protection of electrically sensitive components. In an embodiment of the present invention, an electrode with an opening is placed in parallel with an electrically sensitive component. The electrode with the opening and the electrically sensitive component are sealed within an enclosure with a gas. In certain embodiments after undergoing high energy spikes, the present invention may promote complete failure of systems by concentrating the energy at or near the opening of the electrode.

DETAILED DESCRIPTION OF THE PREFERRED EMBODIMENTS

Figure 1:
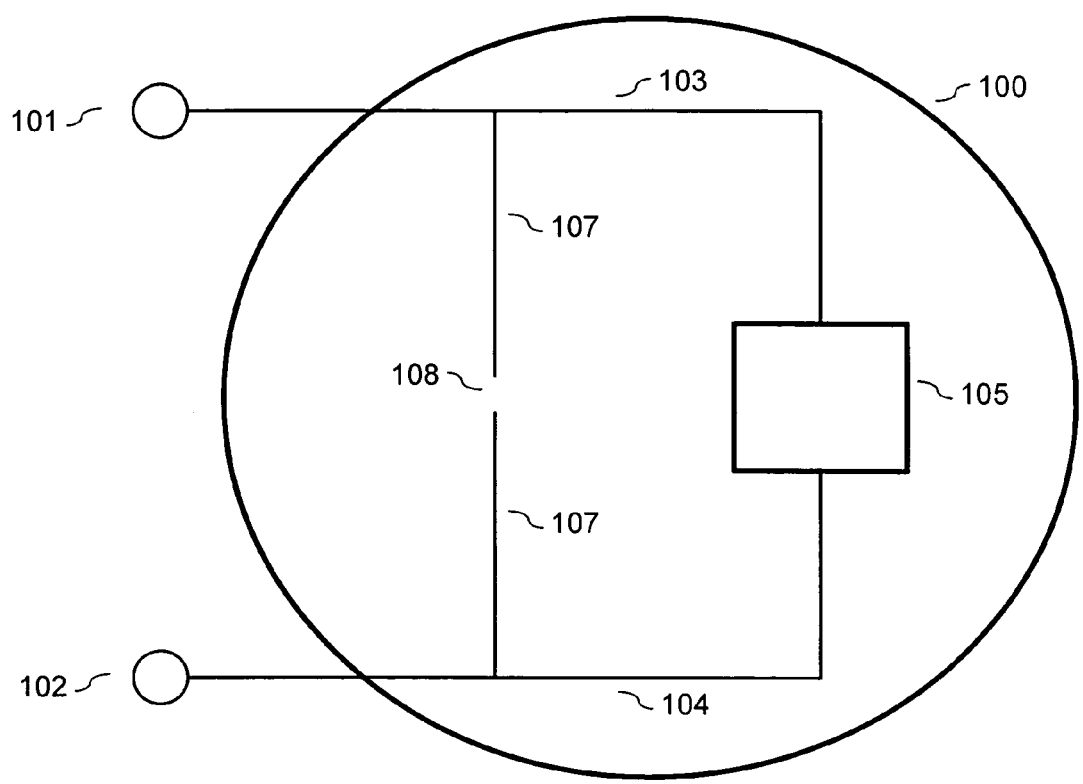
FIG. 1 is an illustration of an embodiment of the present invention for providing protection against electrical surges.

In this specification, for purposes of explanation, specific details are set forth in order to provide an understanding of the invention. It will be apparent, however, to one skilled in the art that the invention can be practiced without these details. Furthermore, one skilled in the art will recognize that embodiments of the present invention, some which are described below, may be incorporated in a number of different devices. Accordingly, structures and devices shown in diagrams or discussed below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearances of the phrases "in one embodiment" or "in an embodiment" in various places in the specification may not be necessarily all referring to the same embodiment.

Electrically sensitive components are often housed in device packaging. For example, most VCSEL devices currently are built around the JEDEC TO-46 device package. The JEDEC TO-46 device package consists of a short cylindrical metal canister, with one end containing an integral glass window, welded hermetically to a metal base through which connection leads pass, via hermetic glass/metal seals. A VCSEL chip is placed inside this package and connected to the leads via thin wires of aluminum or gold.

The small size of such packages precludes the use of any currently available discrete electrical surge protection devices. Furthermore, the technical requirement of low input capacitance precludes fabricating any such device into the component chip itself.

The present invention uses a sealed enclosure, a special arrangement of the internal wiring to form a discharge gap, and gas inside the enclosure to form a gas discharge device which can protect against low level voltage surges, but in so doing, does not significantly add input capacitance.

Electrical discharges through a gas can be predicted by Paschen's Law. Simply put, this law establishes several mathematical equations to determine the breakdown voltage of a gap in a particular gas. Though there are many factors, for practical purposes, the breakdown voltage at which the electrical current will flow across the gap depends predominantly upon the gas pressure and distance between the electrodes. When the breakdown voltage is exceeded, electrons begin to travel across the gap, colliding with the intervening gas molecules which become ionized and contribute to the flow of electrical current. When enough ions have formed in the gap, the gas becomes electrically conductive and exhibits a phenomenon referred to as "negative resistance," which means that the electrical current can increase even as the driving voltage decreases. In the present invention, if the voltage source is a voltage spike, or some other short-lived impulse, the gap discharge will drain the current quickly, preventing or limiting its entry into the electrically sensitive component and preventing the subsequent damage which would otherwise ensue.

The present invention may be optimized for various configurations by adjusting any of a number of parameters as indicated in Paschen's Law. For example, to achieve the breakdown at a desired voltage level, the following factors may be modified (separately or in combination): (1) gas compositions sealed inside the device enclosure; (2) pressure of the gas; and (3) configuration of the wires and structures forming the electrode gap, including thickness of the wires and gap spacing.

It should be noted that some of these factors, such as wire thickness and configuration, may affect the capacitance of the overall system. Since the performance of the component of the system may be affected by the added capacitance, the present invention may be optimized by adjusting these parameters to achieve an acceptable capacitance level. For example, wire thickness may be reduced to minimize the added capacitance.

FIG. 1 illustrates a schematic diagram of an embodiment of the present invention. Component 105 represents an electrically sensitive component or components, such as, for example, a VCSEL. Component 105 is connected via leads 103 and 104 to terminals 101 and 102, respectively. Terminals 101 and 102, or portions thereof, are outside of the sealed enclosure 100 housing component 105. In the embodiment depicted in FIG. 1, an electrode or wire 107 is placed in parallel with component 105. Electrode 107 contains a small opening or gap 108. Component 105 and electrode 107 are sealed within enclosure 100, which could be a JEDEC TO-46 or the like. Also sealed within enclosure 100 is a gas, which could be a single gas or a mixture of gases, at a certain pressure. In one embodiment, the gas may be nitrogen at a pressure less than one atmosphere.

When an electrical surge occurs, the gas between opening 108 breaks down, causing the electrical discharge to flow through electrode 107 and by-pass component 105. Because a vast majority of the electrical discharge flows through electrode 107 rather than through component 105, component 105 is protected from excess voltage surges.

Figure 2:
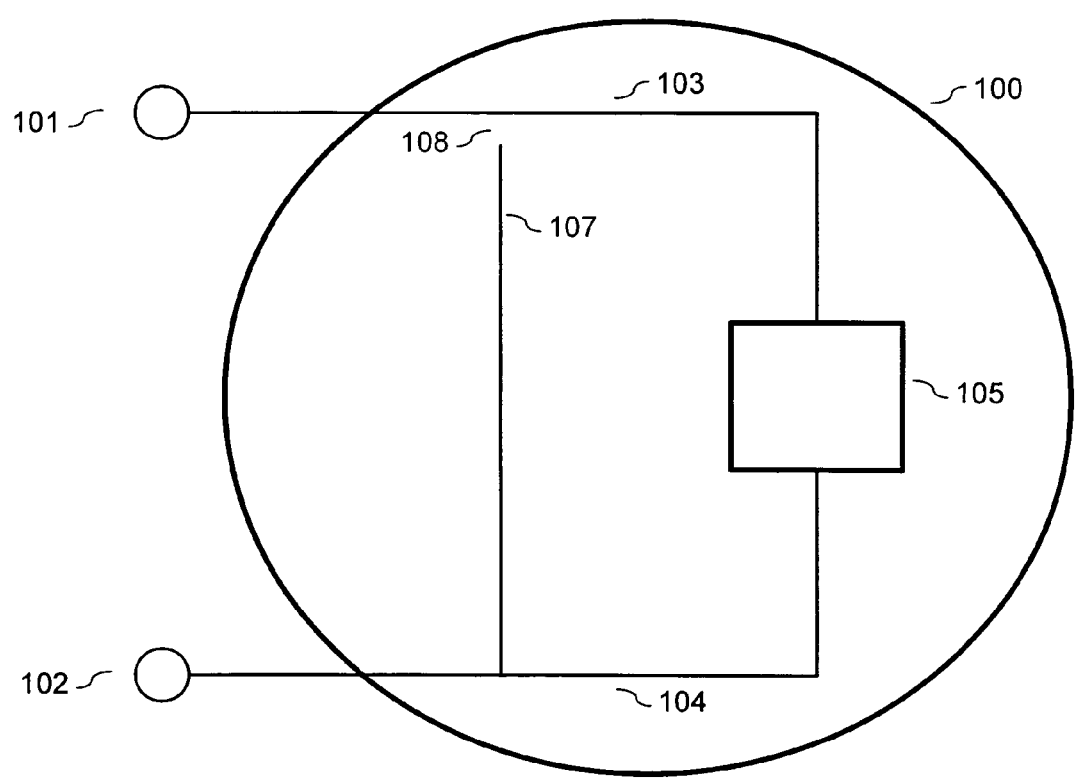
FIG. 2 is an illustration of an alternate embodiment of the present invention for providing protection against electrical surges.

FIG. 2 depicts an alternate embodiment of the present invention. In FIG. 2, gap 108 is placed near one end of electrode 107. FIG. 2 illustrates that opening 108 may be located anywhere along the length of electrode 107, including at either of its ends.

Figure 3A:
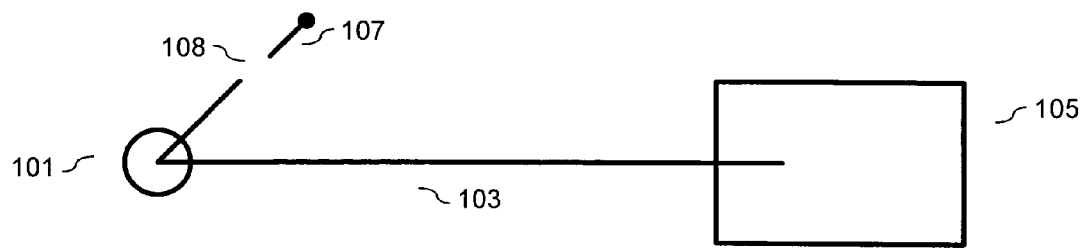
FIG. 3A is the top view of an alternate embodiment of the present invention for providing protection against electrical surges.
Figure 3B:
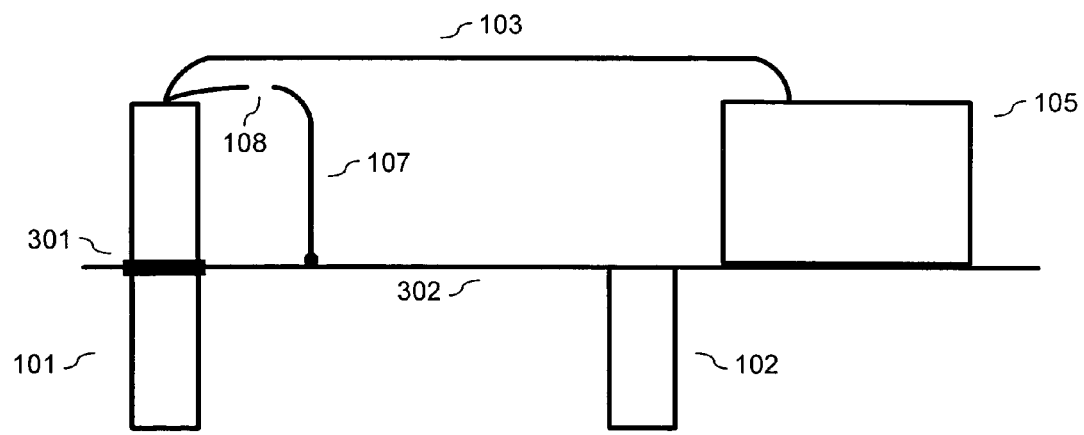
FIG. 3B is a side view of the embodiment in FIG. 3A.

FIGS. 3A and 3B show an embodiment in which a gas discharge element may be formed within an enclosure or package that houses the electrically sensitive component or components. FIG. 3A is the top view of the inside of a sealed enclosure. Referring to FIG. 3B, the side view of FIG. 3A, component 105 is housed within the sealed enclosure. Component 105 is electrically connected to terminal 102 via electrically contact 302, which may be the housing or a part of the housing/enclosure. Terminal 102 may be the ground terminal. Component 105 is also electrically connected to terminal 101 via wire 103. At point 301, terminal 101 is electrically isolated from 302 and sealed so that no gas can enter into or escape from the inside of the enclosure. Inside the enclosure and connected to terminal 101 is a wire or electrode 107 with a small gap 108. The other end of electrode 107 is electrically connected to terminal 102. As noted with respect to FIG. 2, gap 108 may occur anywhere along the length of electrode 107.

Figure 4A:
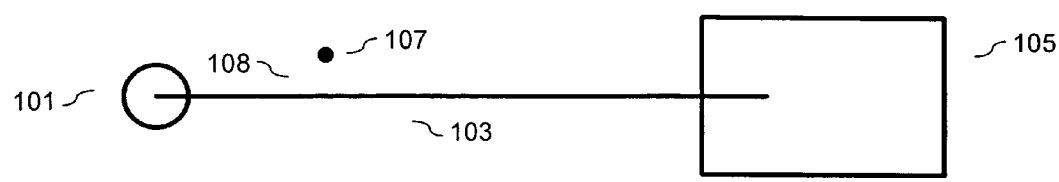
FIG. 4A is the top view of an alternate embodiment of the present invention for providing protection against electrical surges.
Figure 4B:
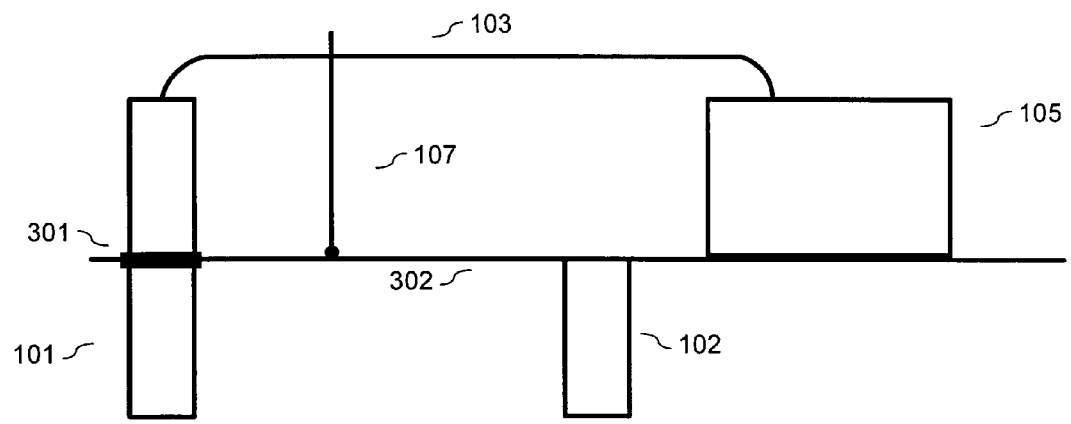
FIG. 4B is a side view of the embodiment in FIG. 4A.

FIGS. 4A and 4B depict an alternate embodiment of the present invention. Referring to FIG. 4B, the side view of FIG. 4A, electrode 107 is electrically connected to terminal 102 and resides near wire 103, which electrically connects terminal 101 to component 105. As best illustrated in FIG. 4A, electrode 107 possesses a small gap 108 between it and wire 103. Although configured differently than the other embodiments, this embodiment also functions to protect component 105 when the voltage difference between terminals 101 and 102 spikes.

Figure 5A:
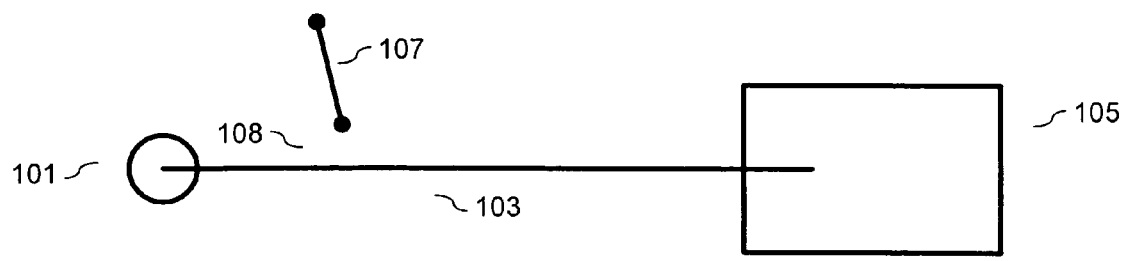
FIG. 5A is the top view of an alternate embodiment of the present invention for providing protection against electrical surges.
Figure 5B:
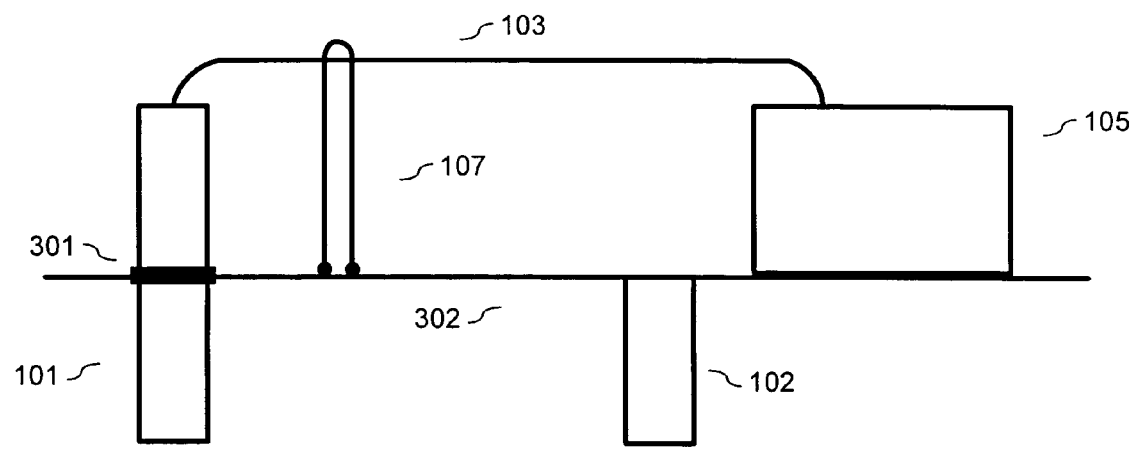
FIG. 5B is a side view of the embodiment in FIG. 5A.

FIGS. 5A and 5B depict an alternate embodiment of the present invention. Some commercial production machinery may require fixing an electrode at two ends. As depicted in FIGS. 5A and 5B, electrode 107 is fixed at both ends and is in electrical contact with terminal 102. It should be noted that electrode 107 still possesses an opening 108. As shown in FIG. 5A, the side of electrode 107 nearest wire 103, which electrically connects terminal 101 to component 105, creates gap or opening 108. Although configured differently than the other embodiments, this embodiment also functions to protect component 105 when the voltage difference between terminals 101 and 102 spikes.

It should be noted for embodiments in which an input lead is used as part of the discharge circuit path and if the voltage surge is at a high voltage level or is of long duration, the present invention may cause the thin electrodes or wires inside the device to melt—thereby disconnecting component 105 from the terminal or terminals. Such a result is advantageous because it prevents the device from being used further.

As mentioned previously, electrically sensitive components which have been subjected to electrical surges may only receive non-lethal latent defects. It is believed that electrically sensitive components are most likely damaged by electrical surges during their manufacture or during their subsequent assembly into higher level equipment. Final testing on the assembly lines may not detect these latent defects, but can detect devices which have catastrophically failed. Accordingly, such defects may not be detected until after the device is produced, sold, and built into a higher level assembly or equipment. Over time the damaged device may fail unexpectedly, causing disruption in the end user's application. Thus, the present invention may prevent such latent defect devices from going undetected because it instead creates a total failure, which is generally always detectable.

Figure 6A:
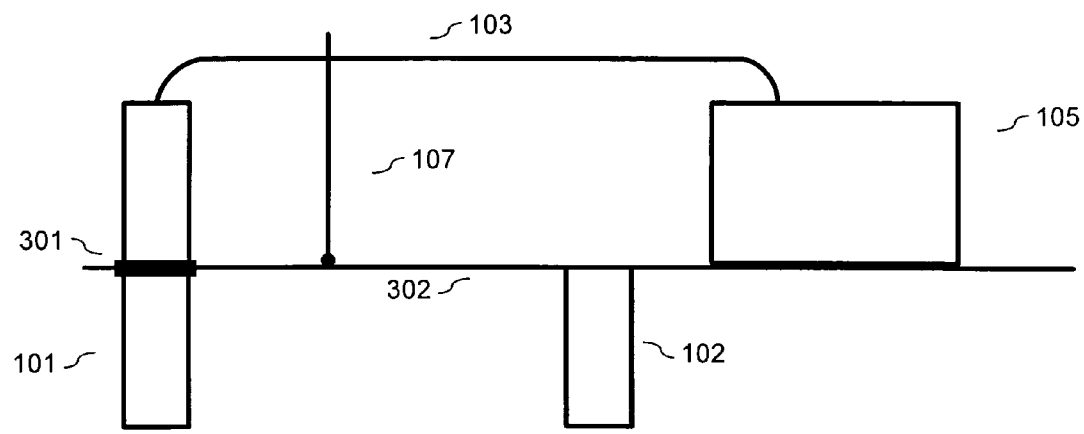
FIG. 6A is a side view of an embodiment of the present invention for providing protection against electrical surges.
Figure 6B:
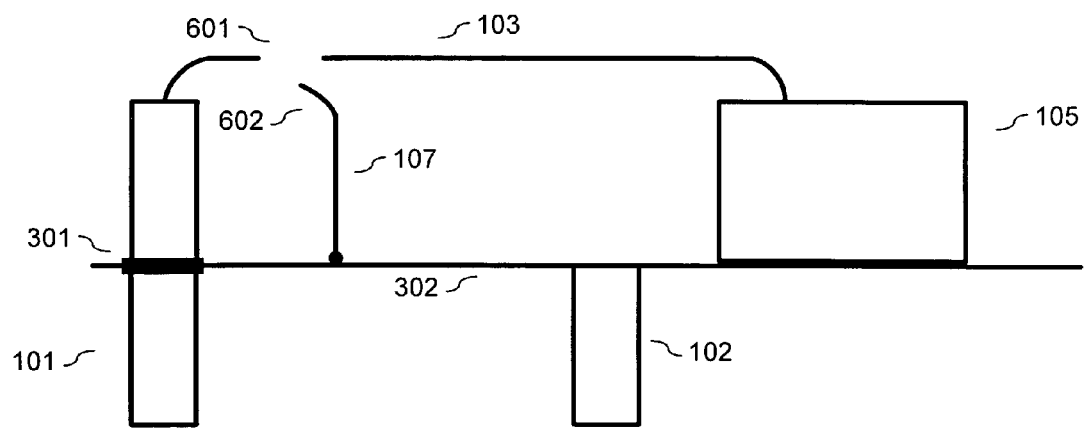
FIG. 6B is a side view of the embodiment depicted in FIG. 6A following a high energy electrical surge.

FIGS. 6A and 6B illustrate an embodiment in which a high energy discharge may produce a complete failure. FIG. 6A depicts an embodiment similar to the one described with respect to FIGS. 4A and 4B. As the electrical spike causes a spark or arc to form in gap 108 (not shown in FIGS. 6A or 6B), current will flow through part of wire or electrode 103. Because the energy of the electrical surge discharge is concentrated at the site of the arcing or sparking between the wires, one or both of electrode 103 and 107 are more susceptible to melting. FIG. 6B illustrates that a portion 601 of electrode 103 has melted creating an open circuit. Electrode 103 may be configured to melt before electrode 107 by making it thinner than electrode 107 and/or making its composition have a lower melting point than electrode 107.

It should be noted that complete failure may also occur if the energy discharges causes the wires to deform and contact. For example, FIG. 6B illustrates that electrode 107 has deformed due to the high energy discharge. In some cases, electrode 107 and/or electrode 103 may deform and contact thereby creating a short circuit. Such a system can be readily detected as defective.

The above description is included to illustrate the operation of various embodiments and is not meant to limit the scope of the invention. The scope of the invention is to be limited only by the following claims. From the above discussion, many variations will be apparent to one skilled in the art that would yet be encompassed by the spirit and scope of the present invention. It should be understood that the invention is to cover all modifications, equivalents, and alternatives falling within the spirit and scope of the claims.

I claim:

1. An electronic system with an electrical discharge protection device system comprising:
   a bond wire forming a spark gap in parallel with an electrically sensitive component;
   a hermetically-sealed enclosure housing the electrically sensitive component and the bond wire;
   a gas contained within the hermetically-sealed enclosure.

2. The system of claim 1 wherein the gas is at a pressure below 1 atmosphere.

3. The system of claim 1 wherein the gas is a mixture of gases.

4. The system of claim 1 wherein the gas is nitrogen.

5. The system of claim 1 wherein the hermetically-sealed enclosure is a JEDEC TO-46 package.

6. The system of claim 1 wherein the electrically sensitive component is a vertical cavity surface emitting laser.

7. The system of claim 1 comprising an electrode connected to the electrically sensitive component wherein the electrode is configured to melt before the bond wire when both are subjected to an electrical surge.

8. The system of claim 1 wherein the spark gap is formed by one selected from the group comprising a gap in the bond wire and a gap between the bond wire and an electrode electrically connected to the electrically sensitive component.

9. An electronic system with an electrical discharge protection device system comprising:
   a vertical cavity surface emitting laser (VCSEL) component;
   a bond wire forming a spark gap in parallel with the VCSEL component;
   a hermetically-sealed enclosure housing the VCSEL component and the bond wire; and
   a gas contained within the sealed enclosure.

10. The system of claim 9 wherein the gas is at a pressure below 1 atmosphere.

11. The system of claim 9 wherein the gas is a mixture of gases.

12. The system of claim 9 wherein the gas is nitrogen.

13. The system of claim 9 wherein the hermetically-sealed enclosure is a JEDEC TO-46 package.

14. The system of claim 9 comprising an electrode connected to the electrically sensitive component wherein the electrode is configured to melt before the bond wire when both are subjected to an electrical surge.

15. The system of claim 9 wherein the spark gap is formed by a gap selected from the group comprising a gap in the bond wire and a gap between the bond wire and an electrode electrically connected to the electrically sensitive component.

16. A method of protecting an electrically sensitive component from an electrical surge comprising the steps of:
   connecting a bond wire to form a spark gap in parallel with the electrically sensitive component;
   placing the bond wire and the electrically sensitive component within a hermetically-sealed enclosure; and
   including a gas within the hermetically-sealed enclosure.

17. The method of claim 16 wherein the gas is at a pressure below 1 atmosphere.

18. The method of claim 16 wherein the gas is a mixture of gases.

19. The method of claim 16 wherein the gas is nitrogen.

20. The method of claim 16 wherein the hermetically-sealed enclosure is a JEDEC TO-46 package.

21. The method of claim 16 wherein the electrically sensitive component is a vertical cavity surface emitting laser.

22. The method of claim 16 further comprising the step of connecting an electrode to the electrically sensitive component wherein the electrode is configured to melt before the bond wire when both are subjected to an electrical surge.

23. The method of claim 16 wherein the spark gap is formed by a gap selected from the group comprising a gap in the bond wire and a gap between the bond wire and an electrode electrically connected to the electrically sensitive component.

* * * * *